(12) United States Patent  
Chin et al.

(10) Patent No.: US 6,721,396 B2
(45) Date of Patent: Apr. 13, 2004

(54) METHOD AND SYSTEM OF ENHANCING EMERGENCY CALL SERVICES

(75) Inventors: Frances Mu-Fen Chin, Naperville, IL (US); Daisy Feng-Mei Su, Wheaton, IL (US); ZhongJin Yang, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/180,824

(22) Filed: Jun. 26, 2002

(65) Prior Publication Data

US 2004/0001572 A1 Jan. 1, 2004

(51) Int. Cl.[7] .............................................. H04M 11/00
(52) U.S. Cl. ........................ 379/45; 379/37; 379/93.23
(58) Field of Search .............................. 379/45, 37, 38, 379/39, 40, 41, 42, 93.23, 93.25; 455/404

(56) References Cited

U.S. PATENT DOCUMENTS

| | | | | |
|---|---|---|---|---|
| 5,787,429 A | * | 7/1998 | Nikolin, Jr. ................... | 379/37 |
| 6,073,004 A | * | 6/2000 | Balachandran ............... | 379/39 |
| 6,169,955 B1 | * | 1/2001 | Fultz ............................ | 455/39 |
| 6,225,944 B1 | * | 5/2001 | Hayes ..................... | 342/357.1 |
| 6,343,120 B1 | * | 1/2002 | Rhodes .................... | 379/93.23 |
| 6,351,495 B1 | * | 2/2002 | Tarraf ......................... | 375/259 |
| 6,600,812 B1 | * | 7/2003 | Gentillin et al. .............. | 379/45 |
| 2002/0027975 A1 | * | 3/2002 | Oxley ......................... | 379/45 |

* cited by examiner

Primary Examiner—Stella Woo

(57) ABSTRACT

A system and method comprises an emergency server for storing pre-provisioned emergency information for a subscriber position and embedding the information in an emergency call delivered to a public safety answering position terminal.

22 Claims, 5 Drawing Sheets

METHOD AND SYSTEM OF ENHANCING EMERGENCY CALL SERVICES

BACKGROUND

The present invention is directed to a system and method for the pre-provisioning of emergency information about a subscriber in an emergency service call sent over a telecommunication network.

A Public Safety Answering Position (PSAP) is a contact that a caller makes when the caller dials 911 from a subscriber station. The PSAP operator determines the nature of the emergency and decides which emergency response teams should be notified. In some instances, the primary PSAP may dispatch assistance.

Currently, when a caller dials 911, the PSAP only receives limited information about the caller such as a call back number, the originating mobile numbers or the PSTN numbers, and location information. Collecting information about the caller is time consuming and prolongs the response time. It also requires that the caller who may be in the midst of an emergency be fully responsive to the PSAP operator if the appropriate emergency assistance is to be dispatched.

As the population ages and demographic changes of the population results in an increased percentage of older people, increasing amounts of medical attention provided on an emergency basis will be required. While a prolonged contact or conference with a PSAP team will enable the appropriate medical and emergency teams to respond to a 911 call, any interruption in the call caused by a medical emergency or any interruption in the 911 call will delay dispatching the appropriate assistance to the origin of the 911 call. The interruption, for example, can be caused by a medical emergency incapacitating the caller before the caller can describe the nature of the medical emergency to the PSAP operator.

SUMMARY

A system and method comprises an emergency information server for storing pre-provisioned emergency information about a subscriber. A switch receives an emergency service call from the subscriber station and queries the emergency information server for any pre-provisioned emergency information about the subscriber. The pre-provisioned emergency information received is embedded in the emergency service call and delivered over a telecommunication network to a PSAP terminal.

DESCRIPTION OF THE DRAWINGS

Features and aspects of examples of the invention will become apparent from the description, the claims, and the accompanying drawings in which:

DETAILED DESCRIPTION

The particular configurations and methods discussed in this application are non-limiting examples and can be varied and are described to merely illustrate examples of the invention and are not intended to limit the scope of the invention.

Figure 1:
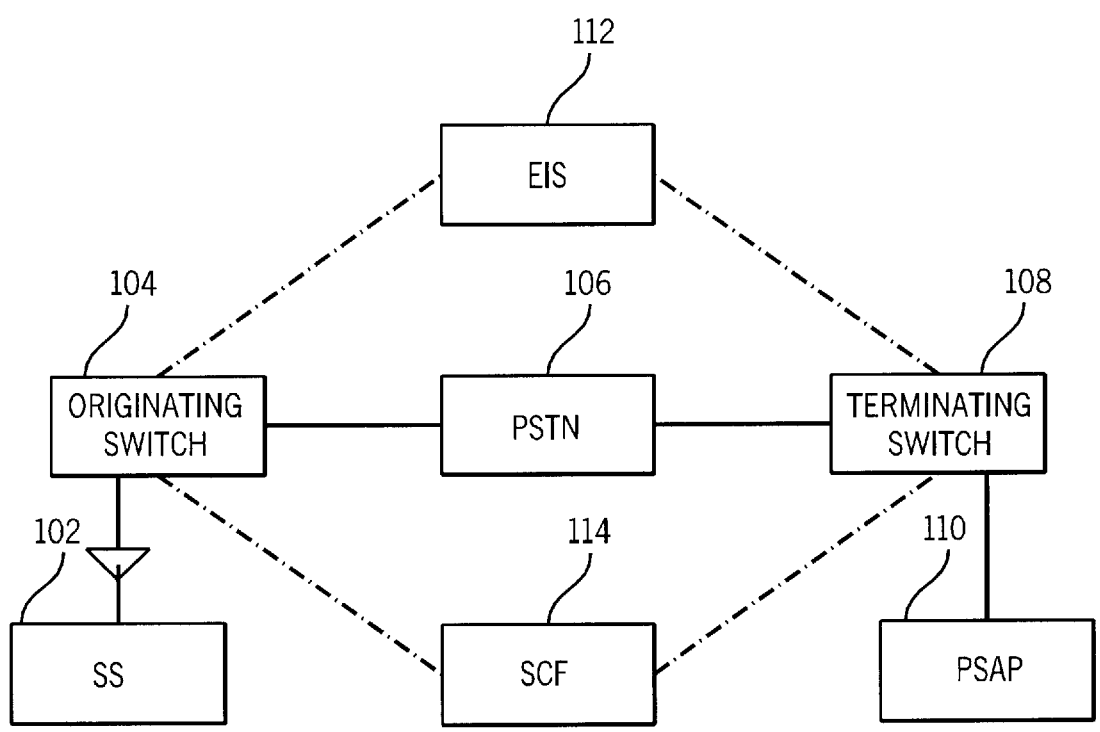
FIG. 1 is a functional block diagram representation of one example of a system in accordance with the invention.

FIG. 1 illustrates an example of an implementation of a system 100 of a telecommunication network for enhancing emergency call services. The system 100 provides emergency personnel with pre-provisioned emergency information such as health/medical information, address or related personal emergency information of a calling party from a subscriber station when the calling party initiates an emergency service call by dialing 911. Upon receipt of the emergency service call, the emergency personnel can prepare for the special needs of the emergency situation associated with a particular emergency service call. The appropriate supplies and personnel can be organized and coordinated to respond to a specific emergency.

Knowing the needs of a particular caller upon receiving the emergency service call enables the response to the emergency to begin promptly. Furthermore, the appropriate response can be made to the emergency even if the call is interrupted because of the inability of the caller to complete the call because of the emergency situation.

In FIG. 1, the system 100 in accordance with an example of the invention comprises a subscriber station (SS) 102 which may be either a wireless or land line subscriber station connected to an originating switch 104. The originating switch 104 is connected to a network such as a public switched telephone network (PSTN) 106, which is connected to a terminating switch 108. The terminating switch 108 is connected to the public safety answering point (PSAP) terminal 110. Alternatively, a network including a network that includes a Service Control Function (SCF) 114 may be used to connect the originating switch 104 and the terminating switch 108. Whether a PSTN, SCF or other network arrangement is used to send an emergency service call from the originating switch 104 to the terminating switch 108 is dictated by the architecture of the network. The examples provided herein are described in terms of a network using a PSTN.

When an emergency service call is initiated by dialing 911 from the subscriber station 102, the call is connected to the PSAP terminal 110 by a connection from the subscriber station 102 through the originating switch 104, the PSTN 106, the terminating switch 108 and then to the PSAP terminal 110.

Figure 2:
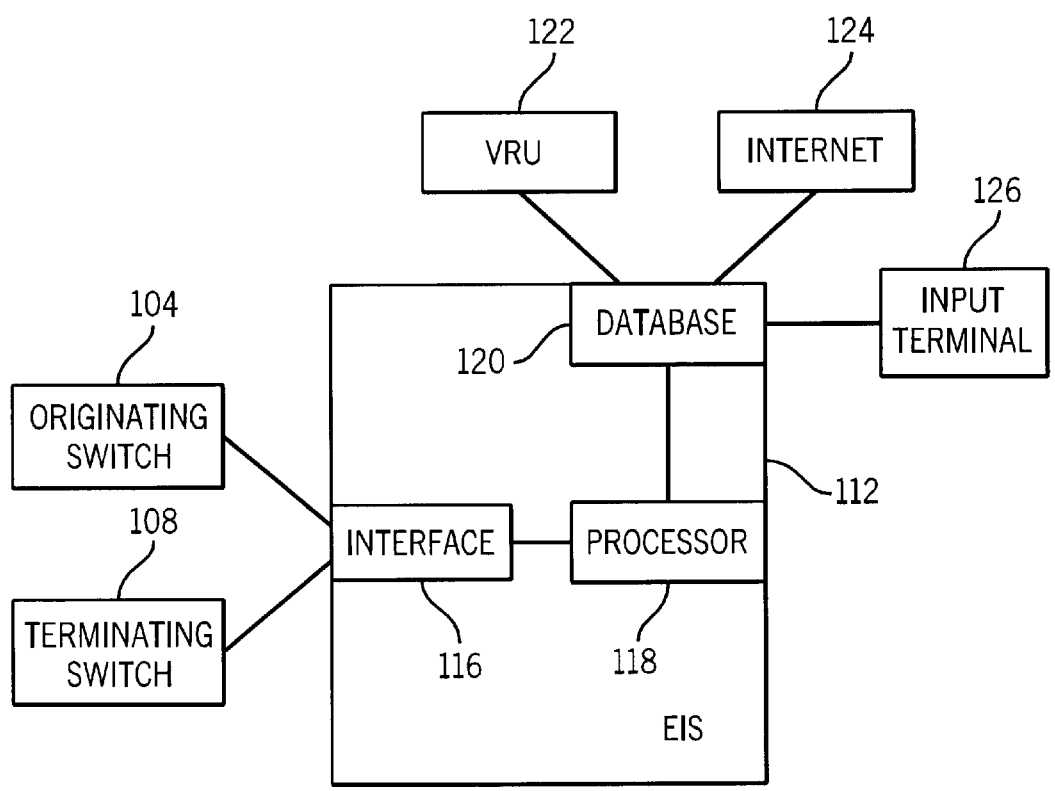
FIG. 2 is a functional block diagram of representation of an example of an emergency information server (EIS) in accordance with of the invention.

Referring to FIGS. 1 and 2, the system 100 includes an example of an emergency information server (EIS) 112. The EIS 112 includes a database 120 that stores pre-provisioned emergency information about subscribers who elect to store pre-provisioned emergency information and are connected to switches in the network such as the originating switch 104 and the terminating switch 108. Alternatively, the EIS 112 may be integrated in the architecture of the switch 104 and/or the terminating switch 108.

Referring to FIG. 2, the EIS 112 comprises an interface 116, a processor 118, and a database 120. The database 120 in the EIS 112 is pre-provisioned with emergency information in a number of ways. For example, the subscriber may pre-provision emergency information in the EIS 112 via a remote device such as a voice respond unit (VRU) 122, an Internet web interface 124 or a customer input terminal 126. The pre-provisioned emergency information may only be released from the database 120 in the EIS 112 with authorization provided from the subscriber station 102. Both the originating switch 104 and the terminating switch 108 are connected to the EIS 112 via the interface 116.

In an example of the operation of the system 100, an emergency call via 911 is initiated by the subscriber at subscriber station 102. The originating switch 104 receives the emergency call and a query is made by the originating switch 104 of the EIS 112. The query is received at the interface 116 of the EIS 112. When interface 116 receives the query from the EIS 112, it connects and sends the query to the processor 118. The processor 118, then, queries the database 120 for the pre-provisioned emergency information of the subscriber station 102. If pre-provisioned emergency information is available, the processor 118 returns the queried pre-provisioned emergency information to the originating switch 104 via the interface 116.

After the originating switch 104 receives the pre-provisioned emergency information about the subscriber at the subscriber station 102, the pre-provisioned emergency information is then sent to the originating switch 104 over a network connection. The originating switch 104 then embeds the pre-provisioned emergency information the emergency service call. The originating switch 104 then sends the emergency service call to the terminating switch 108 over a network connection between the originating switch 104 and terminating switch 108. In one example, the emergency service call is connected through the PSTN 106 to the terminating switch 108. The terminating switch 108 then connects the emergency service call with the embedded information to the PSAP terminal 110. The PSAP terminal 110 answers the emergency service call and obtains the pre-provisioned emergency information about the subscriber at the subscriber station 102. The appropriate emergency service response to the pre-provisioned emergency information can begin to be assembled upon receipt of the emergency call even if the subscriber is unable to complete the call because of the emergency.

In another example of the invention, the originating switch 104 sends the emergency service call without any pre-provisioned emergency information to the terminating switch 108 through a connection with a network such as the PSTN 106. Upon receipt of the emergency service call, the terminating switch 108 queries the EIS 112 for pre-provisioned emergency information associated with the subscriber at the subscriber station 102. Any pre-provisioned emergency information is sent by the EIS 112 to the terminating switch 108. The terminating switch 108 embeds the information in the emergency service call that is then sent to the PSAP terminal 110 where the call is processed as previously explained in the description of FIG. 2. The emergency service call is then delivered to the PSAP terminal 110 from the terminating switch 108.

The terminating switch 108 determines if the pre-provisioned emergency information of the subscriber station 102 should be queried based on the condition of an indicator device that includes EIS flag information received from the signaling data for the 9-1-1 call. If the EIS flag is set to 'No', i.e. the pre-provisioned emergency information has not yet been embedded in the 9-1-1 call at the originating switch 104, the terminating switch 108 should send the query to the EIS 112 for the pre-provisioned emergency information of the subscriber station 102. Presently, when the call originates from subscriber station 102 that is a wireless Mobile Station (MS), number portability (NP) in the SS7 enabled network has implemented a NP flag to indicate if the originating switch 104 has performed the NP check if the called MS has been ported to a different number. The NP flag is sent via the signaling path to the terminating switch 108. If the NP flag is set to 'N', i.e. the number portability check is not performed at the originating switch 104, the terminating switch 108 has to perform the number portability check for the called party.

In the example of the invention shown in FIG. 1 and FIG. 2, both the originating switch 104 and the terminating switch 108 can embed the pre-provisioned emergency information in the emergency call. The emergency information is formatted as a series of data packets. The method of embedding uses the "blank-and-burst" technique to replace every $n^{th}$ voice packet with a data packet. Those skilled in the art are familiar with the "blank-and burst" and an example of this embedding technique is used in call waiting tone alerting. Another example of the embedding technique is disclosed in the presentation of caller line identification (CLI) and calling name (CNAME) in the Signaling System 7 (SS7) enabled network. The terminating switch 108 receives the CLI and CNAME information about the caller and embeds information in the voice call before presenting it to the called party. In this CLI and CNAME example, the Mobile Station (MS) is capable of displaying the caller's number and name. Similarly, in an example of the invention, the PSAP is capable of presenting the pre-provisioned emergency information about the caller.

Figure 3:
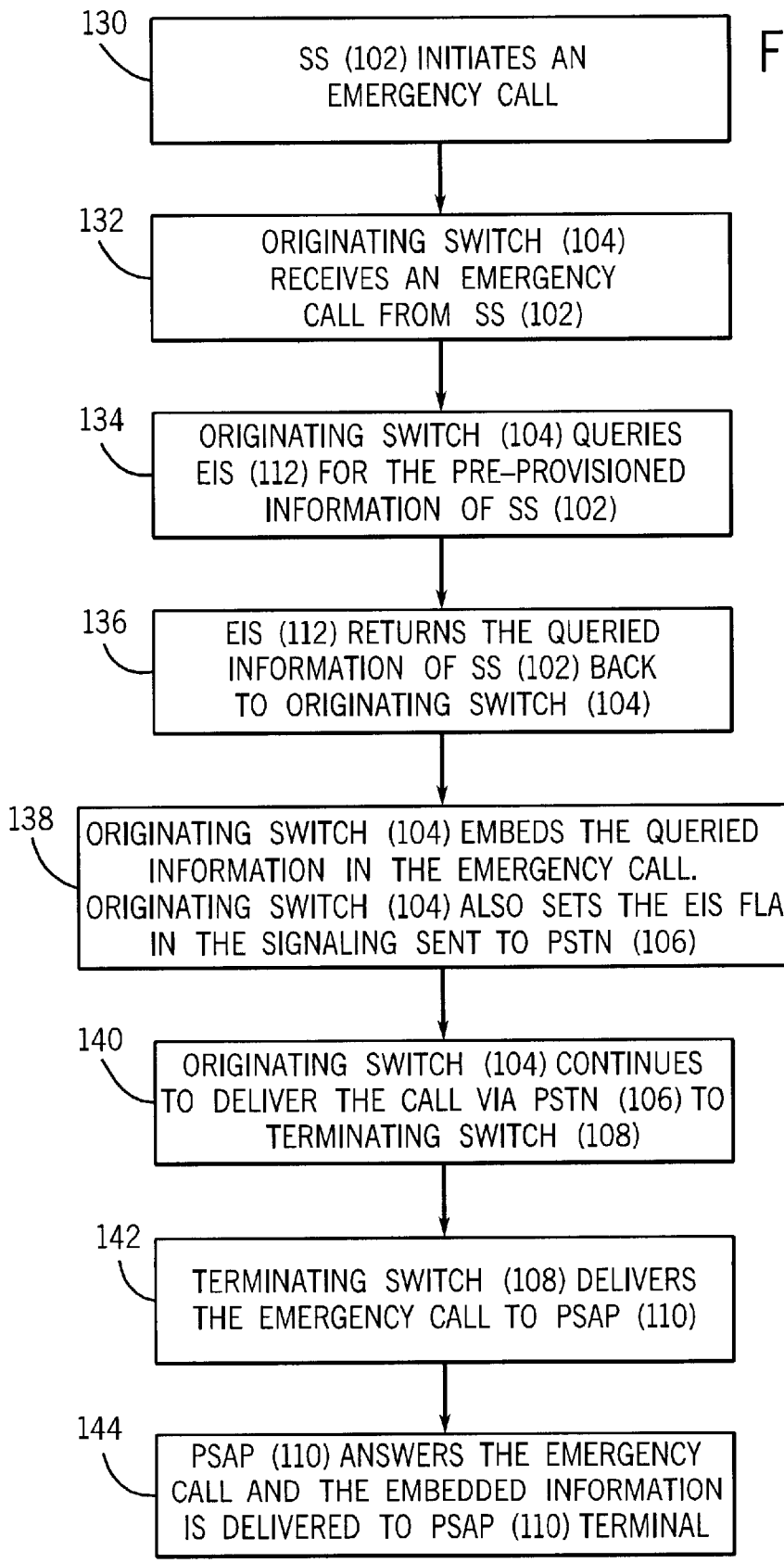
FIG. 3 is a flow chart of method of an emergency service call received at the originating switch with the query of the emergency information server initiated from the originating switch.
Figure 4:
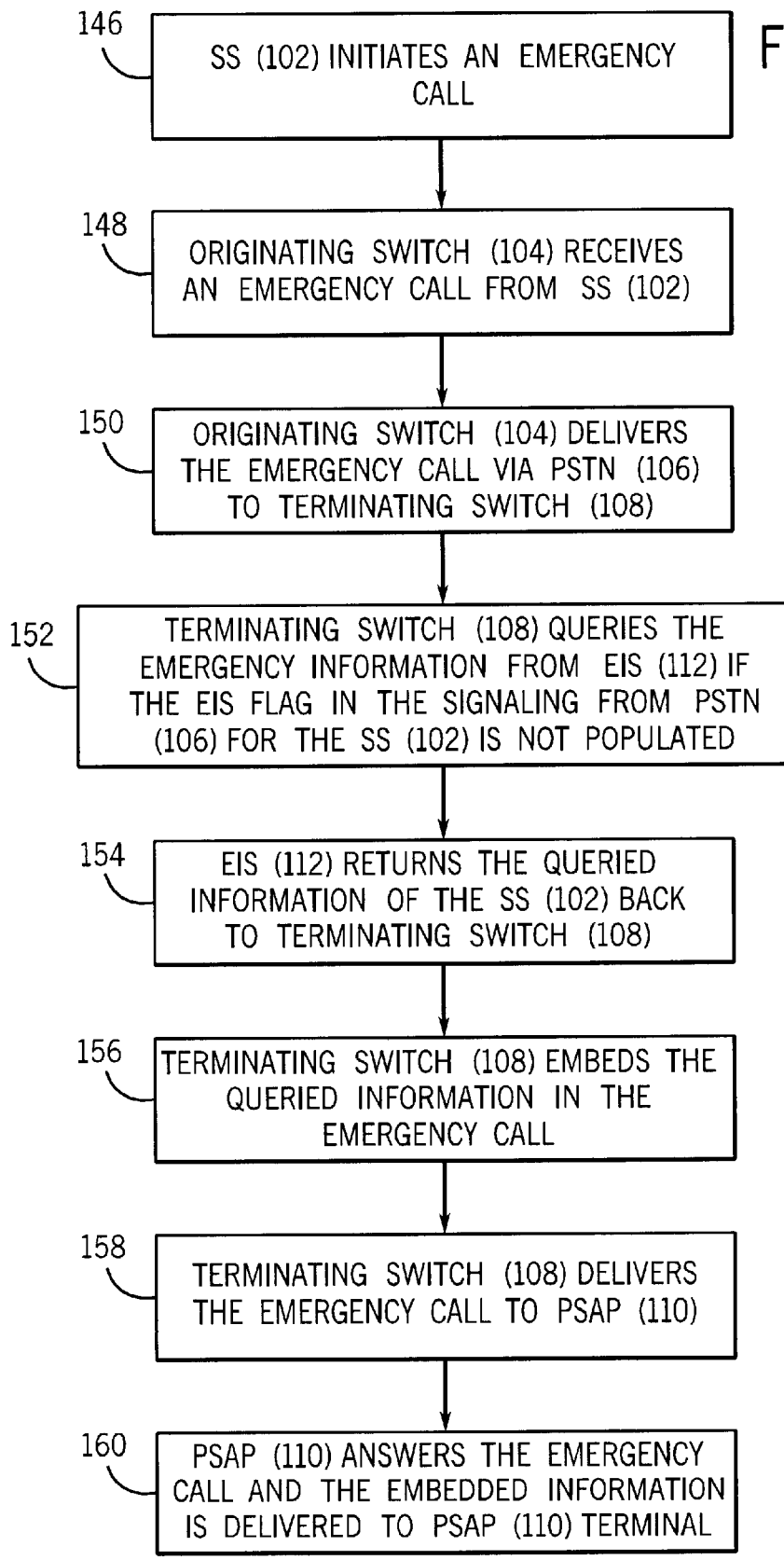
FIG. 4 is a flow chart of a method of an emergency service call received at the originating switch and with the query of the emergency information server initiated from the terminating switch.
Figure 5:
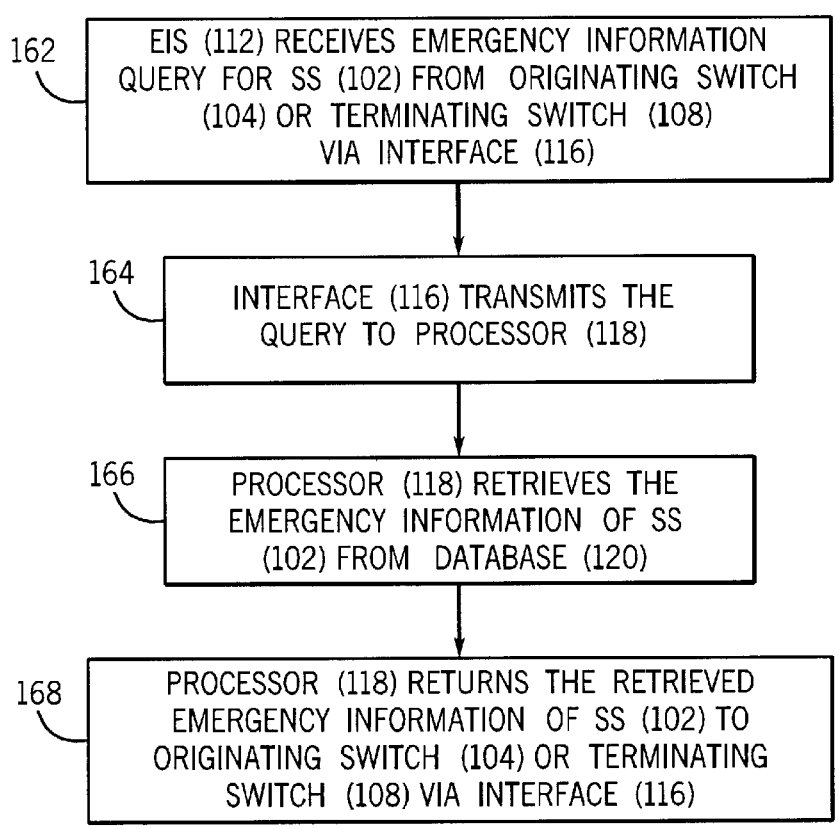
FIG. 5 is a flow chart of the operation of the emergency information server.

FIGS. 3, 4 and 5 depict method steps in accordance with examples of the invention and include: a method of an emergency service call received at the originating switch 104 with the query of the emergency information server initiated from the originating switch 104; a method of an emergency service call received at the originating switch 104 and with the query of the emergency information server initiated from the terminating switch 108; and a method of the operation of the EIS 112.

In FIG. 3, at step 130 an emergency service call is initiated at the subscriber station 102. At step 132, the originating switch 104 receives the call. At step 134, the originating switch 104 quires the EIS 112 for the pre-provisioned emergency information of subscriber station 102, and at step 136, the EIS 112 returns the response or information to the query back to the originating switch 104. At step 138, the originating switch 104 embeds the queried information in the emergency call and the originating switch 104 sets the EIS flag in the signaling sent to the PSTN 106. Alternatively in this method, a network including an SCF could be used instead of the PSTN. This choice will be determined by the architecture of the network. In step 140, the emergency service call is delivered to the terminating switch 108 via the PSTN 106. In step 142, the terminating switch 108 delivers the emergency service call to the PSAP terminal 110, and then in step 144 the PSAP terminal answers the emergency service call, and the embedded information is delivered to the PSAP terminal 110.

In FIG. 4, at step 146 the emergency call is initiated at subscriber station 102. At step 148, the originating switch 104 receives an emergency call from the subscriber station 102. Then at step 150, the originating switch 104 delivers the emergency service call via the PSTN 106 to the terminating switch 108. Alternatively in this method, a network including an SCF could be used instead of the PSTN. This choice will be determined by the architecture of the network. In step 152, the terminating switch 108 queries the EIS 112 if the EIS flag in the signaling received from the PSTN 106 for the subscriber station 102 is not populated, and in step 154, the EIS 112 returns queried information of the subscriber station 102 to the terminating switch 108. In step 154, the EIS 112 returns the queried information of the subscriber station 102 back to the terminating switch 108. In step 156, the terminating switch 108 embeds the queried information in the emergency service call. In step 158, the terminating switch 108 delivers the emergency call to the PSAP terminal 110, and then in step 160, the PSAP terminal 110 answers the emergency service call, and the embedded information is delivered to the PSAP terminal 119.

In FIG. 5, at step 162 the EIS 112 receives a query for pre-provisioned emergency information for the subscriber station 102 from the originating switch 104 or the terminating switch 108 via the interface 116. In step 164, the interface 116 transmits the query to the processor 118. In step 166, the processor 118 retrieves the emergency information for the subscriber station 102 from the database 120. Then at step 168, the processor 118 returns the retrieved pre-provisioned emergency information of the subscriber station 102 to the originating switch 104 or the terminating switch 108 via the interface 116.

The systems, steps or operations described herein are just examples. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A system comprising:
   an emergency information server for storing pre-provisioned emergency information about a subscriber; and
   a switch that receives an emergency service call and queries the emergency information server for the pre-provisioned emergency information, wherein the switch embeds the pre-provisioned emergency information in the emergency service call, wherein the switch sets an emergency information server flag that indicates the pre-provisioned emergency information has been embedded.

2. The system of claim 1, wherein the switch embeds the pre-provisioned information in the emergency service call is embedded as a data packet as a replacement for a voice packet in the emergency service call.

3. The system of claim 1, wherein the switch comprises an originating switch, and further comprising a network that connects the emergency call between the originating switch and a terminating switch.

4. The system of claim 3, wherein the network is at least one of a public switched telephone network and a network including a service control function.

5. The system of claim 3, further comprising a public safety answering point terminal that receives the emergency service call from a connection with the terminating switch.

6. The system of claim 1, wherein the switch comprises a terminating switch that queries the emergency information server for the pre-provisioned emergency information and embeds the pre-provisioned information in the emergency service call.

7. The system of claim 6, further comprising a public safety answering point terminal that receives the emergency service call from a connection with the terminating switch.

8. The system of claim 7, further comprising an indicator device, wherein a condition of the indicator determines, through employment of the emergency information server flag, whether the terminating switch queries the emergency information server.

9. The system of claim 1, wherein the emergency information server comprises:
   an interface that receives the query from the switch;
   a processor that receives the query from the interface; and
   a database that receives and stores the pre-provisioned emergency information associated with a subscriber station.

10. The system of claim 9, wherein the subscriber station is a land line subscriber station.

11. The system of claim 9, wherein the subscriber station is a wireless subscriber station.

12. The system of claim 9, wherein the database receives pre-provisioned emergency information from an Internet web interface.

13. The system of claim 9, wherein the database receives pre-provisioned emergency information from a voice response unit.

14. The system of claim 9, wherein the database receives pre-provisioned emergency information from a customer input terminal.

15. A system comprising:
   an emergency information server for storing pre-provisioned emergency information about a subscriber, wherein the emergency information server comprises an interface, a processor that receives a query from the interface, and a database that receives and stores the pre-provisioned emergency information associated with a subscriber station and input to the database from a remote device; and
   a switch that receives an emergency service call from a subscriber station and queries the interface of the emergency information server for pre-provisioned emergency information about the subscriber, and wherein the pre-provisioned emergency information is embedded in the emergency service call as a data packet as a replacement for every $n^{th}$ voice packet, wherein the switch sets an emergency information server flag that indicates the pre-provisioned emergency information has been embedded.

16. A method comprising, the steps of:
   storing pre-provisioned emergency information about a subscriber in an emergency information server;
   querying the emergency information server from a switch that receives an emergency information call for the pre-provisioned emergency information; and
   embedding the pre-provisioned emergency information in the emergency service call;
   setting an emergency information server flag that indicates the pre-provisioned emergency information has been embedded.

17. The method of claim 16, comprising the step of sending the emergency service call containing the embedded pre-provisioned emergency information through a connection with a telecommunication network to public safety answering point terminal.

18. The method of claim 17, wherein the telecommunication network is a public switched telephone network.

19. The method of claim 17, wherein the telecommunication network is a network including a service control function.

20. The method of claim 16, wherein the step of embedding includes the step of embedding the pre-provisioned information as a data packet as a replacement of a voice packet in the emergency service call.

21. The method of claim 16, wherein the step of storing includes the step of storing the pre-provisioned emergency information in a database in the emergency information server, the method further comprising the step of
   supplying the pre-provisioned emergency information to the database from a remote device.

22. The method of claim 21, wherein the remote device is at least one of an Internet web interface, a voice response unit and a customer input terminal.

* * * * *